(12) United States Patent
Sugawara et al.

(10) Patent No.: US 7,570,502 B2
(45) Date of Patent: Aug. 4, 2009

(54) INVERTER APPARATUS COMPRISING SWITCHING ELEMENTS

(75) Inventors: Yoshitaka Sugawara, Osaka (JP); Katsunori Asano, Osaka (JP); Mitsuru Matsukawa, Kyoto (JP); Yoshifumi Minowa, Kyoto (JP); Toshihiko Shikata, Kyoto (JP)

(73) Assignees: The Kansai Electric Power Co., Inc., Osaka (JP); Nissin Electric Co., Ltd., Kyoto (JP)

( * ) Notice: Subject to any disclaimer, the term of this patent is extended or adjusted under 35 U.S.C. 154(b) by 98 days.

(21) Appl. No.: 10/565,389

(22) PCT Filed: Jul. 23, 2004

(86) PCT No.: PCT/JP2004/010897

§ 371 (c)(1),
(2), (4) Date: Jan. 23, 2006

(87) PCT Pub. No.: WO2005/011096

PCT Pub. Date: Feb. 3, 2005

(65) Prior Publication Data

US 2006/0245223 A1    Nov. 2, 2006

(30) Foreign Application Priority Data

Jul. 24, 2003    (JP)    ............................. 2003-279312

(51) Int. Cl.
*H02M 7/5387*    (2007.01)
(52) U.S. Cl. ........................... 363/132; 363/17; 363/40; 363/55; 363/56.02
(58) Field of Classification Search .................. 363/17, 363/132, 40, 55, 56.01, 56.02
See application file for complete search history.

(56) References Cited

U.S. PATENT DOCUMENTS 4,447,867 A    5/1984    Evans (Continued)

FOREIGN PATENT DOCUMENTS

EP    0 328 941 A1    8/1989

(Continued)

OTHER PUBLICATIONS

Decision of Refusal in corresponding Japanese Patent Application 2003-279312, dated Sep. 8, 2008.

(Continued)

*Primary Examiner*—Akm E Ullah
*Assistant Examiner*—Arun Williams
(74) *Attorney, Agent, or Firm*—Finnegan, Henderson, Farabow, Garrett & Dunner, L.L.P.

(57) ABSTRACT

A problem to be solved by the present invention is to eliminate variation in potential in a turn-off time period of each GTO element, and to stabilize a gate drawing current by surely performing the turn-off of the GTO element. In an inverter apparatus having a three-phase inverter configured to include paired GTO elements an inverter control portion has a simultaneous switching prevention function of delaying a turn-on operation of each of the GTO elements which correspond to phases other than a phase corresponding to an optional one of the GTO elements and also correspond to an electrode opposite to an electrode corresponding to the optional one of the GTO elements by a predetermined time in a case where a turn-on command signal for turning on each of the GTO elements is generated within a predetermined time period since the turn-off of the optional one of the GTO elements.

8 Claims, 8 Drawing Sheets

U.S. PATENT DOCUMENTS

| | | | | |
|---|---|---|---|---|
| 4,546,422 | A | * | 10/1985 | Okado .......................... 363/41 |
| 4,628,241 | A | * | 12/1986 | Bristow et al. .............. 318/778 |
| 4,802,079 | A | * | 1/1989 | Mizoguchi ................... 363/71 |
| 4,829,415 | A | * | 5/1989 | Haferl ......................... 363/26 |
| 5,671,130 | A | * | 9/1997 | Kerkman et al. .............. 363/41 |
| 5,912,813 | A | * | 6/1999 | Kerkman et al. .............. 363/98 |
| 6,570,780 | B2 | * | 5/2003 | Furukawa et al. ............. 363/98 |
| 2006/0186435 | A1 | * | 8/2006 | Sugawara ................... 257/170 |

FOREIGN PATENT DOCUMENTS

| | | |
|---|---|---|
| JP | 01-303067 | 12/1989 |
| JP | 06-113559 | 4/1994 |
| JP | 10-112984 | 4/1998 |
| JP | 11-206183 | 7/1999 |
| JP | 2000-295863 | 10/2000 |
| JP | 2002-111010 | 4/2002 |
| JP | 2002-260835 | 9/2002 |

OTHER PUBLICATIONS

Japanese Office Action dated Jan. 8, 2009 by Japanese Patent Office for counterpart Japanese Application No. 2003-279312.

European Search Report dated May 8, 2009 for counterpart European Application No. 04748104.9 - 1242, 4 pages.

Fernando-Silva J., "Improving the reliability, the robustness and the performance of a three phase GTO voltage source inverter," Electrotechnical Conference, 1991, Proceedings, 6$^{th}$ Mediterranean LJubljana, Slovenia, IEEE, May 22, 1991, pp. 1327-1330.

* cited by examiner

INVERTER APPARATUS COMPRISING SWITCHING ELEMENTS

TECHNICAL FIELD

The present invention relates to an inverter apparatus enabled to prevent a simultaneous switching operation of switching elements, which are used and constitute a three-phase inverter incorporated in, for example, a large-capacity UPS, a battery energy storage system, or the like, from occurring during each of the switching elements performs an on/off operation.

BACKGROUND ART

A three-phase inverter serving as a kind of an electrical power converter incorporated in, for example, a large-capacity UPS, a battery energy storage system, or the like is adapted to perform the conversion of a dc voltage supplied from a dc power supply E, such as a solar battery and a fuel cell, into an ac voltage and to supply electric power to loads UL, VL, and WL, as shown in FIG. 7. The three-phase inverter has a structure in which paired switching elements, which are arranged in an up/down direction, as viewed in this figure, and which correspond to each of a U-phase, a V-phase and a W-phase, for examples, GTO (Gate Turn-Off thyristor) elements UP, UN, VP, VN, WP, WN are connected in a bridge configuration.

This inverter apparatus is adapted so that the paired GTO elements corresponding to each of the phases are alternately turned on and off, that is, a group of the GTO elements UP, VP, WP, which are shown at upper positions in the figure and correspond to a positive electrode, and a group of the GTO elements UN, VN, WN, which are shown at lower positions in the figure and correspond to a negative electrode, are alternately turned on and off. Consequently, a dc voltage supplied from the dc power supply E is converted into an ac voltage thereby to supply ac power to the loads UL, VL, and WL, as shown in FIG. 7.

A sinusoidal waveform control signal is converted into a pulse gate signal by using a triangular waveform carrier signal. Then, each of the GTO elements UP, UN, VP, VN, WP, and WN is turned on by being applied with a forward bias voltage through the use of the gate driver. Alternatively, each of the GTO elements UP, UN, VP, VN, WP, and WN is turned off by being applied with a reverse bias voltage through the use of the gate signal.

On/off control of these GTO elements UP, UN, VP, VN, WP, and WN is performed so that in a case where the GTO elements UP, VP, WP shown at the upper positions are in an on-state, among the paired GTO elements, and where the GTO elements UN, VN, WN shown at the lower positions are in an off-state, when the GTO elements UN, VN, WN shown at the lower positions are turned on, the GTO elements UP, VP, WP shown at the upper positions are turned off before the GTO elements UN, VN, WN turn on.

A dead time, in which the GTO elements UP, VP, WP, UN, VN, WN of both of the group shown at the upper positions and that shown at the lower positions are simultaneously brought into a turned-off state, is provided to turn on the GTO elements UN, VN, WN shown at the lower positions after a predetermined interval elapses after the GTO elements UP, VP, WP shown at the upper positions turn off. Consequently, both of the group of the GTO elements UP, VP, WP shown at the upper positions and that of the GTO elements UN, VN, WN shown at the lower positions are prevented from simultaneously being put into a turned-on state. Thus, an occurrence of a dc shortcircuit is prevented (see, for example, JP-A-10-112984).

DISCLOSURE OF INVENTION

Meanwhile, generally, as shown in FIG. 8, slight stray capacitances $C_1$ to $C_6$ are formed between output wires and between the output wire and the earth (or a casing) in the aforementioned inverter apparatus. Therefore, the presence of a dead time, in which the GTO elements of both the group shown at the upper positions and that shown at the lower positions are simultaneously in a turned-off state, as described above, results in discharge of electric charges stored in the stray capacitances to thereby vary the midpoint potential of the GTO elements corresponding to a phase with respect to that of the GTO elements corresponding to another phase. Incidentally, the apparatus similarly has slight stray capacitances $C_7$ to $C_{10}$ formed between a gate drive circuit A and each main circuit wire and between the gate drive circuit A and the earth. Thus, the aforementioned variation in the midpoint potential results in variation in the potential of the gate drive circuit. Consequently, a disturbance current is given to a gate current.

Meanwhile, the GTO element has a thyristor structure (pnpn-structure). Thus, the turn-on gain thereof is large, while the turn-off gain thereof is extremely small. Consequently, the turn-on of the GTO element takes several tens of microseconds. Additionally, during that, a large drawing current is necessary for the turn-off. In a case where the gate drawing current in that time becomes unstable due to the disturbance current as described above, the GTO element fails to turn off, and comes to be unable to turn off. In the worst case, there is the possibility of damaging the GTO element.

The aforementioned phenomenon occurs in a case where after the GTO element corresponding to one of the phases and to one of the electrodes turns off, a turn-on command signal for turning on the GTO element corresponding to one of the other phases and to the opposite electrode (in a case where the GTO element corresponding to the one of the phases and to the one of the electrodes is the GTO element UP, the GTO element corresponding to the one of the other phases and to the opposite electrode is the GTO element VN or WN). Occurrence of the simultaneous switching of this GTO element corresponding to the other phase causes a problem that the gate drawing current becomes unstable.

Accordingly, the invention is proposed in view of the aforementioned problem. An object of the invention is to provide an inverter apparatus enabled to eliminate variation in potential-to-the-ground of the GTO element that corresponds to one of the phases and is performing a turn-off operation, which variation is caused by the switching operation of this GTO element corresponding to the other phase, and also enabled to stabilize the gate drawing current by surely achieving the turn-off of the GTO element.

As technical means for attaining the foregoing object, according to the invention, there is provided an inverter apparatus having a three-phase inverter configured to include paired switching elements connected in a bridge configuration and to convert a power supply voltage, which is supplied from a dc power supply, by the switching elements into an ac voltage. This inverter apparatus features that an inverter control portion has a simultaneous switching prevention function of delaying a turn-on operation of each of the switching elements, which correspond to phases other than a phase corresponding to an optional one of the switching elements and also correspond to an electrode opposite to an electrode corresponding to the another one of the switching elements, by a predetermined time in a case where a turn-on command signal for turning on each of the switching elements, which correspond to the other phases, is generated within a predetermined time period after the turn-off of the optional one of the switching elements.

Alternatively, the inverter apparatus according to the invention may feature that an inverter control portion has a simultaneous switching prevention function of delaying a turn-off operation of each of the switching elements, which correspond to phases other than a phase corresponding to an optional one of the switching elements and also correspond to an electrode opposite to an electrode corresponding to the optional one of the switching elements, by a predetermined time in a case where a turn-off command signal for turning off each of the switching elements, which correspond to the other phases, is generated within a predetermined time period since turn-on of the optional one of the switching elements.

Alternatively, the inverter apparatus according to the invention may feature that an inverter control portion has a simultaneous switching prevention function of delaying a turn-on operation of each of the switching elements, which correspond to phases other than a phase corresponding to an optional one of the switching elements and also correspond to an electrode opposite to an electrode corresponding to the optional one of the switching elements, by a predetermined time in a case where a turn-on command signal for turning on each of the switching elements, which correspond to the other phases, is generated within a predetermined time period since turn-off of the optional one of the switching elements, and also delaying a turn-off operation of each of the switching elements, which correspond to phases other than a phase corresponding to an optional one of the switching elements and also correspond to an electrode opposite to an electrode corresponding to the optional one of the switching elements, by a predetermined time in a case where a turn-off command signal for turning off each of the switching elements, which correspond to the other phases, is generated within a predetermined time period since turn-on of the optional one of the switching elements.

According to the invention, the apparatus has the simultaneous switching prevention function. Thus, for example, a turn-on operation of each of the switching elements, which correspond to phases other than a phase corresponding to an optional one of the switching elements and also correspond to an electrode opposite to an electrode corresponding to the optional one of the switching elements, is delayed by a predetermined time in a case where a turn-on command signal for turning on each of the switching elements, which correspond to the other phases, is generated within a predetermined time period since the turn-off of the optional one of the switching elements. Consequently, the simultaneous switching of the switching elements corresponding to the other phases can be prevented. Thus, the variation in potential-to-the-ground of the GTO element can be prevented from occurring during a turn-off operation thereof. Also, the stabilization of the gate drawing current can be achieved by surely turning off the GTO elements.

Incidentally, according to the invention, not only the Si-GTO element but the SiC-GTO element, which is able to operate at a higher temperature and a higher voltage than the Si-GTO element, can be used as the switching element. Alternatively, a wide-gap semiconductor, such as diamond and GaN, can be used as the switching element.

According to the invention, the apparatus has the simultaneous switching prevention function. Thus, a turn-on or turn-off operation of each of the switching elements, which correspond to phases other than a phase corresponding to an optional one of the switching elements and also correspond to an electrode opposite to an electrode corresponding to the optional one of the switching elements, is delayed by a predetermined time in a case where a turn-on or turn-off command signal for turning off each of the switching elements, which correspond to the other phases, is generated within a predetermined time period since the turn-off or the turn-on of the optional one of the switching elements. Consequently, the simultaneous switching of the switching elements corresponding to the other phases can be prevented. Thus, for instance, the variation in potential-to-the-ground of the GTO element can be prevented from occurring during a turn-off operation thereof. The stabilization of the gate drawing current can be achieved by surely turning off the GTO elements. A high-quality inverter apparatus can be provided without causing a dc short circuit and a damage of the element.

Also, the simultaneous switching prevention function can be realized by either hardware, such as a simultaneous switching prevention circuit including a simultaneous switching prevention logic circuit, a predetermined-post-turning-off-time generating circuit, which is adapted to generate a predetermined post-turning-off time that elapses after turn-off of the optional one of the switching elements, and/or a predetermined-post-turning-on-time generating circuit which is adapted to generate a predetermined post-turning-on time that elapses after turn-on of the optional one of the switching elements, or software installed in the inverter control portion.

Figure 1:
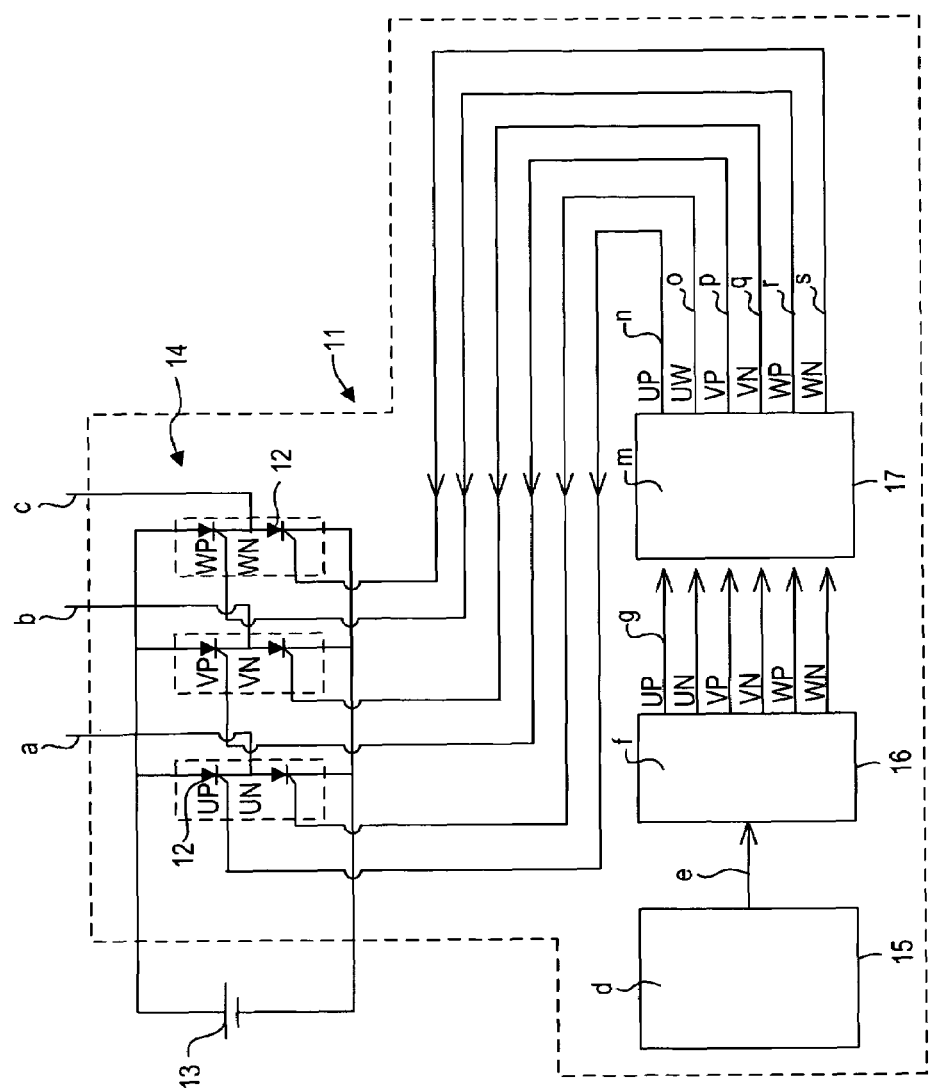
FIG. 1 is a circuit diagram illustrating an embodiment of the invention, which is an inverter apparatus having a three-phase inverter that includes Si-GTO elements.

Incidentally, in the drawings, reference numeral 11 designates an inverter apparatus, reference numeral 12 denotes a switching element (a Si-GTO element), reference numeral 13 designates a dc power supply, reference numeral 14 denotes a three-phase inverter, reference numeral 15 designates an inverter control circuit, reference numeral 16 denotes a PWM pulse generating circuit, reference numeral 17 designates a simultaneous switching prevention circuit, reference numeral 21 denotes a inverter apparatus, reference numeral 22 denotes a switching element (a SiC-GTO element), and reference numeral 24 designates a three-phase inverter.

BEST MODE FOR CARRYING OUT THE INVENTION

Hereinafter, an embodiment of an inverter apparatus according to the invention is described in detail. Incidentally, the following description of the embodiment describes a case where Si-GTO elements 12 are used as the switching elements (see FIGS. 1 and 2), and a case where SiC-GTO elements 22, which can operate at a higher temperature and a higher voltage than the Si-GTO elements 12 (see FIGS. 3 and 4).

Figure 2:
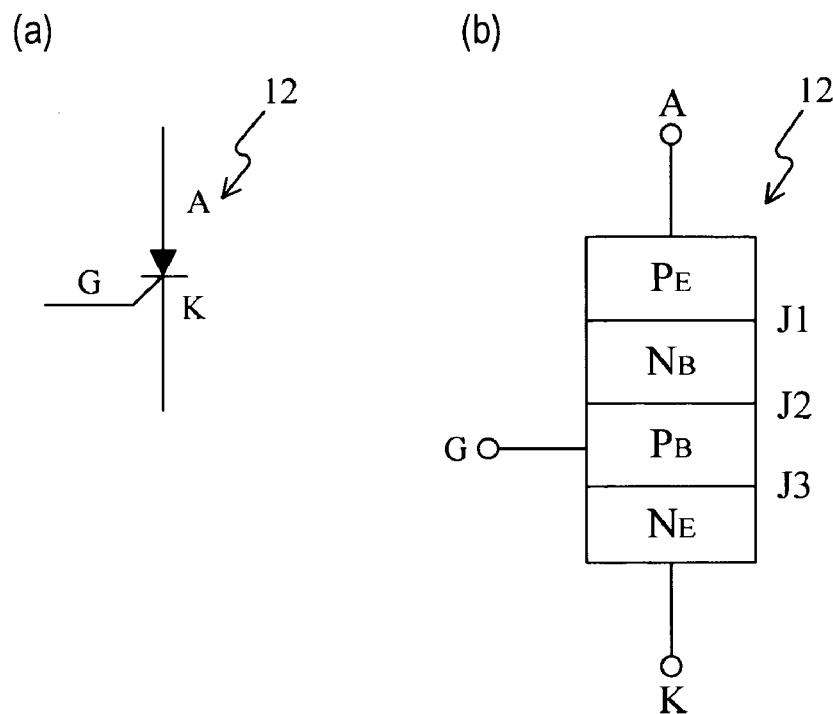
FIG. 2(a) is a diagram illustrating a Si-GTO element.
FIG. 2(b) is a diagram illustrating the internal structure of the Si-GTO element.

FIG. 1 exemplifies an inverter apparatus 11 using Si-GTO elements 12 as the embodiment. FIG. 2(a) shows the Si-GTO 12. FIG. 2(b) shows the internal structure of the Si-GTO 12. As shown in FIGS. 2(a) and 2(b), the Si-GTO element 12 has a pnpn structure obtained by bonding p-type semiconductor regions PE and PB and n-type semiconductor regions NB and NE and having junctions J1, J2, and J3, each of which are provided between the associated bonded regions. An anode A is drawn from the p-type semiconductor region $P_E$. A cathode K is drawn from the n-type semiconductor region $N_E$. A gate G is drawn from the p-type semiconductor region $P_B$.

Generally, the Si-GTO element 12 in an on-state can be turned off by letting a gate current flow in a direction opposite to a direction of the current flowing at the turn-on thereof. That is, when a forward bias voltage is applied between the gate G and the anode A in a state, in which a positive voltage is applied to the anode A and in which a negative voltage is applied to the cathode K and this voltage is blocked by the junction J2, so that the voltage at the gate G is positive with respect to the voltage at the cathode K, holes, the number of which depends upon the magnitude of the gate current, are moved from the gate G to the semiconductor region $P_B$. Similarly to a state in which a base current is supplied to an NPN transistor portion, electrons, the number of which depends upon the magnitude of each of the gate current and the current amplification factor of the NPN transistor portion, are transported from the semiconductor region $N_E$ to the semiconductor region $N_B$. The electrons transported to the semiconductor region $N_B$ serve like the base current of a PNP transistor portion. Also, holes, the number of which depends upon the magnitude of each of the number of electrons and the current amplification factor of the PNP transistor portion, are transported from the semiconductor region $P_E$ to the semiconductor region $P_B$. In this way, what are called carriers, such as holes and electrons, pass through the junction J2 by applying a forward bias voltage between the gate of the NPN transistor portion of the Si-GTO element, which that is in an off-state. Thus, the Si-GTO element cannot maintain the off-state, so that electric current starts flowing, and that the Si-GTO element turns on.

Meanwhile, the Si-GTO element in an on-state cannot maintain the on-state and is put into an off-state in a case where a part of the holes transported from the semiconductor region $P_E$ to the semiconductor region $P_B$ is drawn from the gate G by applying a reverse bias voltage between the gate G and the anode A so that the voltage at the gate G is negative with respect to the voltage at the cathode K (the voltage at the cathode K is positive with respect to the voltage at the gate G), and that electros, the number of which depends upon the magnitude of the gate current, flow into the cathode K from the semiconductor region $N_E$, and where a total of the current amplification factors of the PNP transistor portion and the NPN transistor portion is equal to or less than 1.

Figure 3:
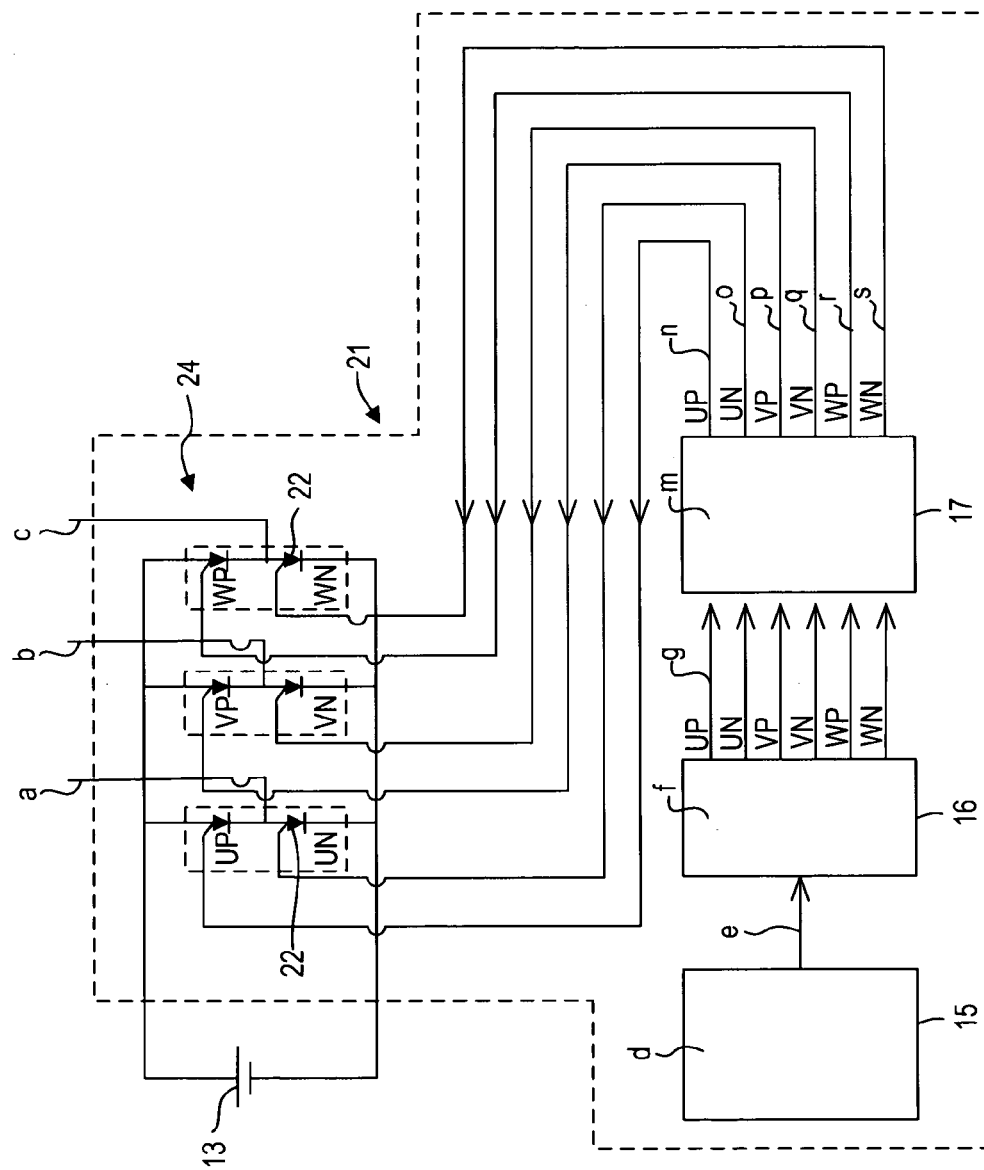
FIG. 3 is a circuit diagram illustrating another embodiment of the invention, which is an inverter apparatus having a three-phase inverter that includes SiC-GTO elements.
Figure 4:
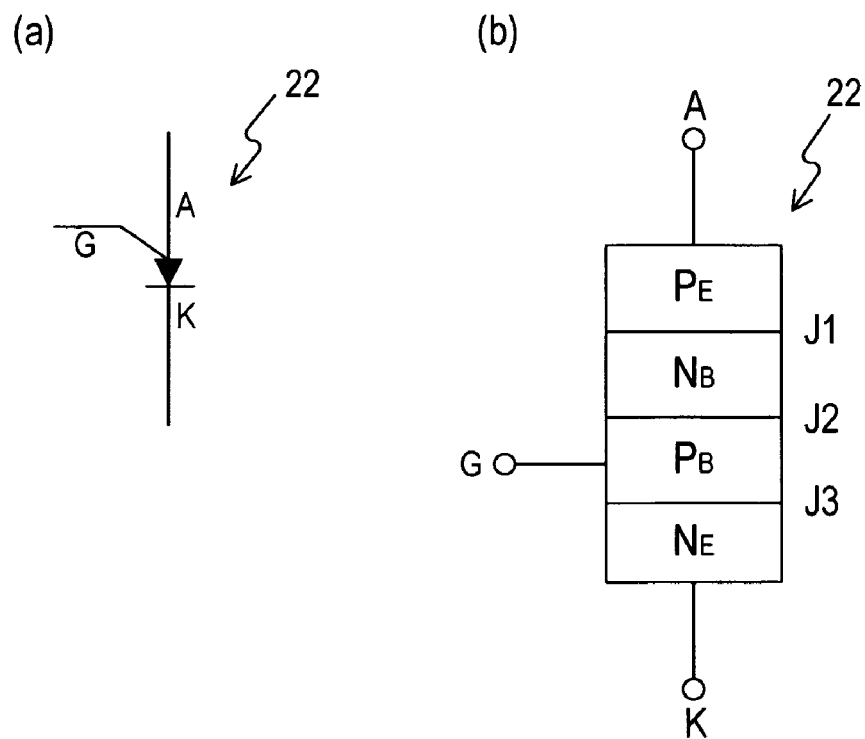
FIG. 4(a) is a diagram illustrating a SiC-GTO element.
FIG. 4(b) is a diagram illustrating the internal structure of this SiC-GTO element.

Referring next to FIG. 3, there is exemplified an inverter apparatus 21 employing SiC-GTO elements 22, which can operate at a higher temperature and a higher voltage than the Si-GTO elements 12, as an embodiment. FIG. 4(a) shows the SiC-GTO 22. FIG. 4(b) shows the internal structure of the SiC-GTO 22. As shown in FIGS. 4(a) and 4(b), the SiC-GTO element 22 has a pnpn structure obtained by bonding p-type semiconductor regions PE and PB and n-type semiconductor regions NB and NE and having junctions J1, J2, and J3, each of which are provided between the associated bonded regions. An anode A is drawn from the p-type semiconductor region $P_E$. A cathode K is drawn from the n-type semiconductor region $N_E$. A gate G is drawn from the n-type semiconductor region $N_B$.

The SiC-GTO element 22 has a basic structure nearly similar to the aforementioned Si-GTO element 12, and differs from the Si-GTO element 12 in that the base part of the PNP transistor portion of the SiC-GTO element is the gate G. Therefore, a turn-on operation and a turn-off operation is performed in the SiC-GTO element 22 by applying a forward bias voltage or a reverse bias voltage between the anode A and the gate G.

Practically, when a forward bias voltage is applied between the gate G and the anode A in a state, in which a positive voltage is applied to the anode A and in which a negative voltage is applied to the cathode K and this voltage is blocked by the junction J2, so that the voltage at the gate G is negative with respect to the voltage at the anode A (the voltage at the anode A is positive with respect to the voltage at the gate G), electrons, the number of which depends upon the magnitude of the gate current, flow into the semiconductor region $N_B$ from the gate G. Similarly to a state in which a base current is supplied to the PNP transistor portion, holes, the number of which depends upon the magnitude of each of the gate current and the current amplification factor of the PNP transistor portion, are transported from the semiconductor region $P_E$ to the semiconductor region $P_B$. The holes transported to the semiconductor region $P_B$ serve like the base current of the NPN transistor portion. Also, electrons, the number of which depends upon the magnitude of each of the number of holes and the current amplification factor of the PNP transistor portion, are transported from the semiconductor region $N_E$ to the semiconductor region $N_B$. In this manner, what are called carriers, such as holes and electrons, pass through the junction J2 by applying a forward bias voltage between the gate of the NPN transistor portion of the SiC-GTO element 22, which that is in an off-state. Thus, the SiC-GTO element 22 cannot maintain the off-state, so that electric current starts flowing, and that the SIC-GTO element 22 turns on.

Meanwhile, the SiC-GTO element in an on-state cannot maintain the on-state and is put into an off-state in a case where apart of the electrons transported from the semiconductor region $N_E$ to the semiconductor region $N_B$ is drawn from the gate G by applying a reverse bias voltage between the gate G and the anode A so that the voltage at the gate G is positive with respect to the voltage at the anode A, and where a total of the current amplification factors of the PNP transistor portion and the NPN transistor portion is equal to or less than 1.

Hereinafter, in view of redundant descriptions of the Si-GTO elements 12 and the SiC-GTO elements 22, the Si-GTO element 12 and the SiC-GTO element 22 are designated in common as the GTO elements UP, UN, VP, VN, WP, and WN, as illustrated in FIGS. 1 and 3.

As shown in FIGS. 1 and 3, each of the embodiments, which are the inverter apparatuses 11 and 21, is configured to include paired GTO elements UP, UN, VP, VN, WP, and WN, which are arranged in an up/down direction, as viewed in these figures, and which correspond to each of a U-phase, a V-phase and a W-phase and are connected in a full bridge configuration, a three-phase inverter 14 or 24 adapted to convert a power supply voltage supplied from the dc power supply 13 into an ac voltage by using the GTO elements UP, UN, VP, VN, WP, and WN, an inverter control circuit 15 adapted to generate and output the output voltage command signals Uref, Vref, and Wref (see FIG. 5) to change the value of an output voltage of the inverter 14 or 24 to a predetermined value, a PWM pulse generating circuit 16 adapted to generate and output drive signals, which cause the GTO elements UP, UN, VP, VN, WP, and WN to perform on/off operations, by performing PWM-modulation on the output voltage command signals Uref, Vref, and Wref, and a simultaneous switching prevention circuit 17 adapted to generate and output a gate signal by delaying the drive signal, which is outputted from the PWM pulse generating circuit 16, by a predetermined time according to conditions that will be described later. Incidentally, an inverter control portion includes the inverter control circuit 15, the PWM pulse generating circuit 16, and the simultaneous switching prevention circuit 17.

Hereinafter, the inverter control circuit 15, the PWM pulse generating circuit 16, and the simultaneous switching prevention circuit 17, which generate gate signals for the GTO elements UP, UN, VP, VN, WP, and WN to drive the three-phase inverter 11 or 21, are described in detail.

Figure 5:
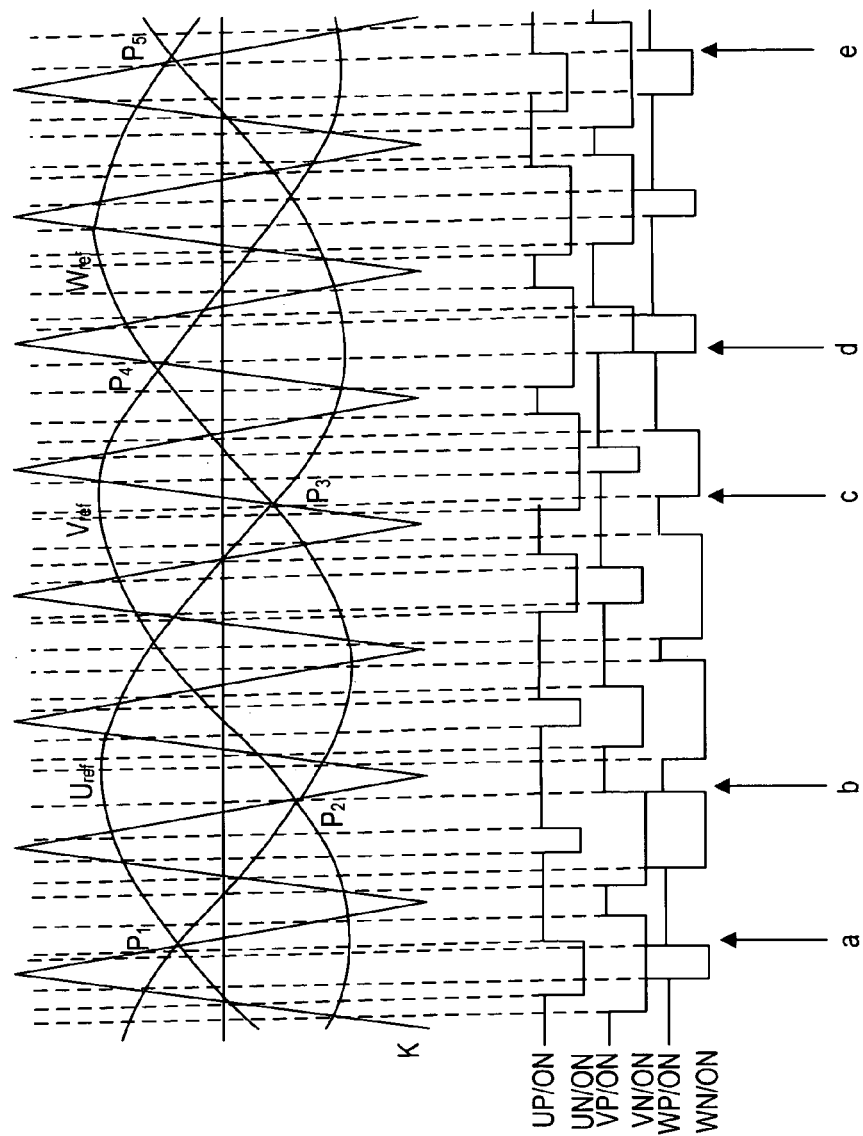
FIG. 5 is a waveform chart illustrating an output voltage command signal, a carrier signal, and a gate initial signal.

The inverter control circuit 15 is adapted to generate sinusoidal waveform output voltage command signals Uref, Vref, and Wref, which correspond to the phases, respectively, and differ from one another in phase by predetermined amounts, as illustrated in FIG. 5.

The PWM pulse generating circuit 16 is adapted to generate the UP, UN, VP, VN, WP, and WN initial signals (see FIGS. 1 and 3), which are drive signals to cause the GTO elements UP, UN, VP, VN, WP, and WN to perform on/off operations, by performing PWM modulation on the output voltage command signals Uref, Vref, and Wref outputted from the inverter control circuit 15, according to triangular waveform carrier signals K.

Figure 6:
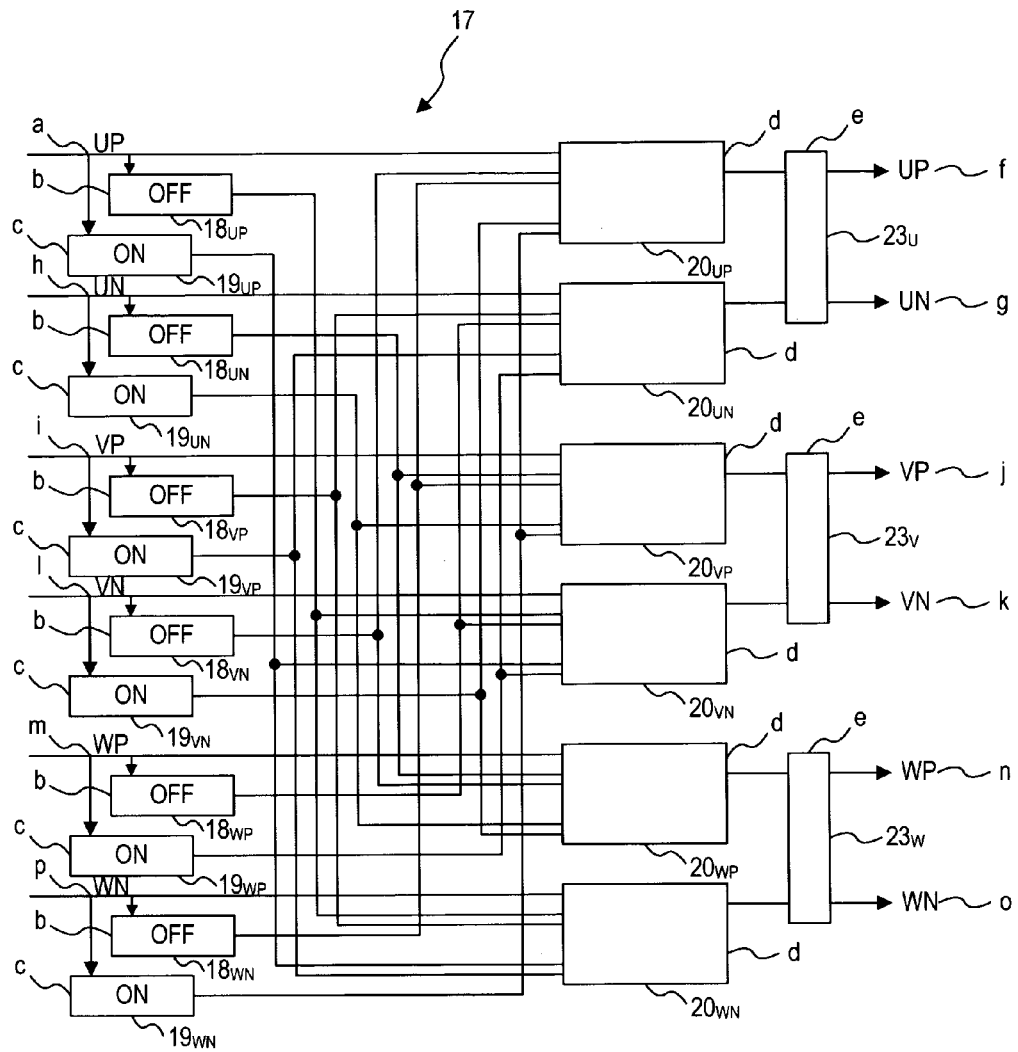
FIG. 6 is a block diagram illustrating the internal structure of a simultaneous switching prevention circuit shown in FIGS. 1 and 3.
Figure 7:
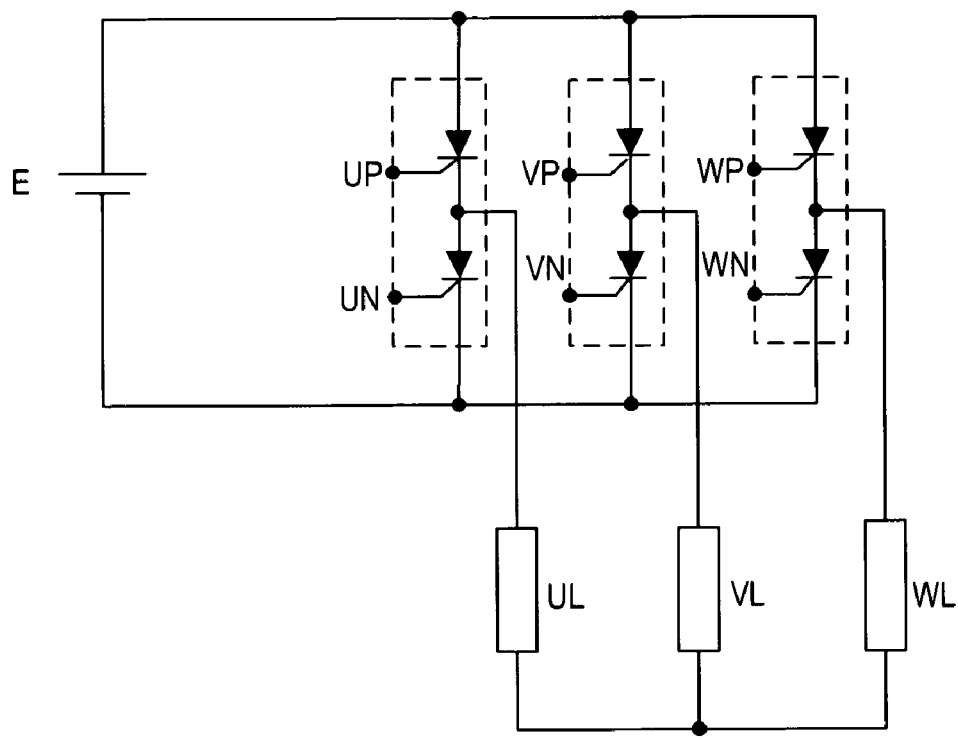
FIG. 7 is a circuit diagram illustrating an example of a three-phase inverter.

As shown in FIG. 6, the simultaneous switching prevention circuit 17 includes post-turning-off $\Delta t_1$ generating circuits $18_{UP}$, $18_{UN}$, $18_{VP}$, $18_{VN}$, $18_{WP}$, and $18_{WN}$, post-turning-on $\Delta t_2$ generating circuits $19_{UP}$, $19_{UN}$, $19_{VP}$, $19_{VN}$, $19_{WP}$, and $19_{WN}$, simultaneous switching preventing logic circuits $20_{UP}$, $20_{UN}$, $20_{VP}$, $20_{VN}$, $20_{WP}$, and $20_{WN}$, and dead time generating circuits $23_U$, $23_V$, and $23_W$.

The post-turning-off $\Delta t_1$ generating circuits $18_{UP}$, $18_{UN}$, $18_{VP}$, $18_{VN}$, $18_{WP}$, and $18_{WN}$ are adapted to generate a predetermined time $\Delta t_1$ after the turn-off of the GTO elements UP, UN, VP, VN, WP, and WN. The post-turning-on $\Delta t_2$ generating circuits $19_{UP}$, $19_{UN}$, $19_{VP}$, $19_{VN}$, $19_{WP}$, and $19_{WN}$ are adapted to generate a predetermined time $\Delta t_2$ after the turn-off of the GTO elements UP, UN, VP, VN, WP, and WN.

The simultaneous switching preventing logic circuits $20_{UP}$, $20_{UN}$, $20_{VP}$, $20_{VN}$, $20_{WP}$, and $20_{WN}$ are adapted to determine according to each of the UP, UN, VP, VN, WP, and WN initial signals, which are outputted from the PWM pulse generating circuit 16, and the signals outputted from the post-turning-off $\Delta t_1$ generating circuits $18_{UP}$, $18_{UN}$, $18_{VP}$, $18_{VN}$, $18_{WP}$, and $18_{WN}$ and the post-turning-on $\Delta t_2$ generating circuits $19_{UP}$, $19_{UN}$, $19_{VP}$, $19_{VN}$, $19_{WP}$, and $19_{WN}$ whether the turn-on operation or the turn-off operation of each of the GTO elements UP, UN, VP, VN, WP, and WN is delayed.

The dead time generating circuits $23_U$, $23_V$, and $23_W$ are adapted to generate a dead time according to an output of each of the simultaneous switching preventing logic circuits $20_{UP}$, $20_{UN}$, $20_{VP}$, $20_{VN}$, $20_{WP}$, and $20_{WN}$.

This simultaneous switching prevention circuit 17 is adapted to delay a turn-on operation of each of the GTO elements VN and WN, which correspond to phases other than a phase corresponding to, for example, the GTO element UP and also correspond to an electrode opposite to an electrode corresponding to the GTO element UP, by a predetermined time in a case where a turn-on command signal for turning on each of the GTO elements VN and WN, which correspond to the other phases, is generated within a predetermined time period $\Delta t_1$ since the turn-off of the GTO element UP. Incidentally, the simultaneous switching prevention circuit 17 is adapted to delay a turn-off operation of each of the GTO elements VN and WN, which correspond to phases other than a phase corresponding to an optional one of the GTO elements and also correspond to an electrode opposite to an electrode corresponding to the optional one of the GTO elements, by a predetermined time in a case where a turn-off command signal for turning off each of the GTO elements, which correspond to the other phases, is generated within a predetermined time period $\Delta t_2$ since the turn-on of the optional one of the GTO elements.

In this embodiment, which is the inverter apparatus 11 or 21, as illustrated in FIGS. 1 and 3, the inverter control circuit 15 is adapted to generate and output the sinusoidal waveform output voltage command signals Uref, Vref, and Wref, which correspond to the phases, respectively, and differ from one another in phase by predetermined amounts, as illustrated in FIG. 5, to cause the three-phase GTO elements UP, UN, VP, VN, WP, and WN to turn on or off with predetermined timing. The output voltage command signals Uref, Vref, and Wref outputted from this inverter control circuit 15 are PWM-modulated at the PWM pulse generating circuit 16 using the triangular waveform carrier signals K. Thus, the UP, UN, VP, VN, WP, and WN initial signals, which are used for causing the GTO elements UP, UN, VP, VN, WP, and WN to perform on/off operations, are generated and outputted.

Figure 8:
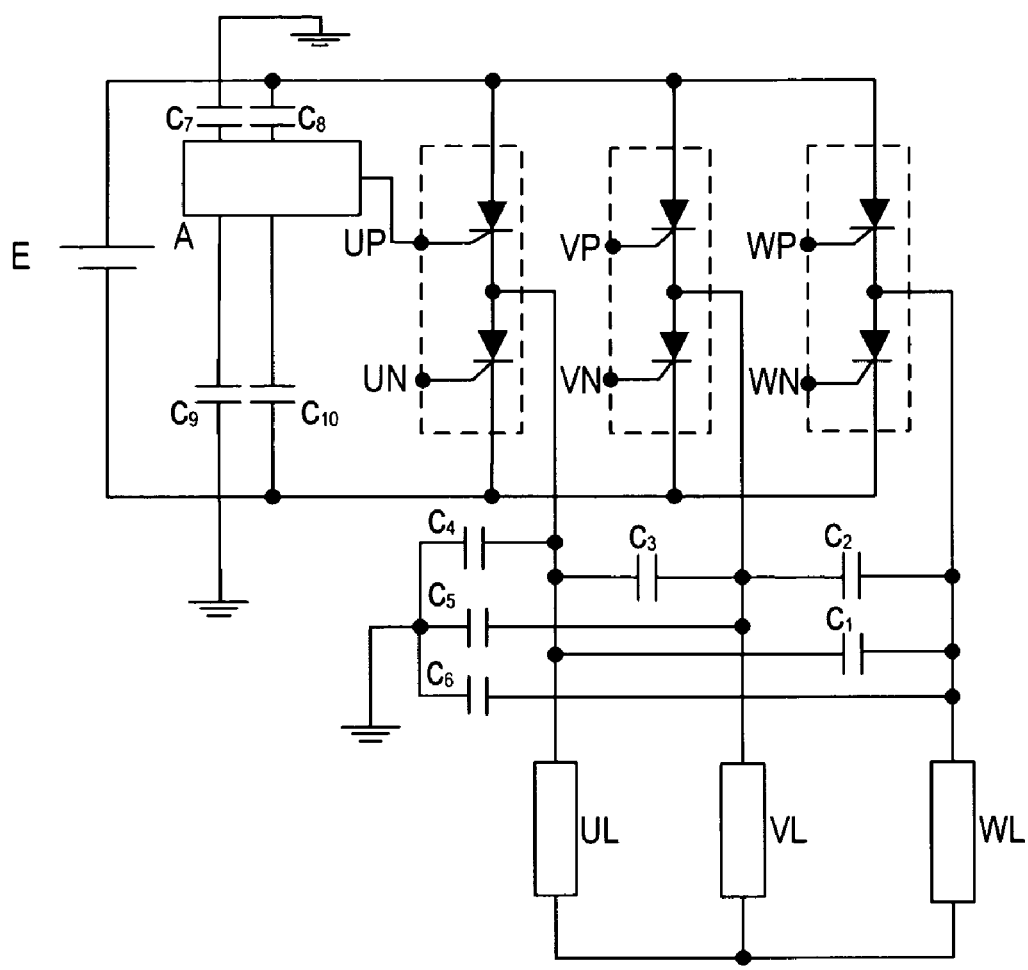
FIG. 8 is an explanatory diagram illustrating the generation of stray capacitances in a three-phase inverter.

Incidentally, as illustrated in FIG. 5, the simultaneous switching of one of the GTO elements corresponding to one of the phases (for example, the GTO element UP) and the GTO elements (for instance, the GTO elements VN and WN), which correspond to the phases other than the phase corresponding to the one of the phases and to an electrode opposite to an electrode corresponding to the one of the GTO elements, occurs at intersection points $P_1$, $P_2$, ..., at each of which the carrier signal K intersects with two of the three-phase output voltage command signals Uref, Vref, and Wref. Thus, variation in potential occurs due to the stray capacitances $C_7$ to $C_{10}$ (see FIG. 8) in the dead time, in which the GTO elements of both the group shown at the upper positions and that shown at the lower positions are simultaneously in a turned-off state. Consequently, the gate drawing current becomes unstable.

Thus, the simultaneous switching prevention circuit 17 is configured so that the dead time generating circuits $23_U$, $23_V$, and $23_W$ delay a turn-on operation of each of the GTO elements VN and WN, which correspond to phases other than a phase corresponding to one of the GTO elements and also correspond to an electrode opposite to an electrode corresponding to the one of the GTO elements, by a predetermined time according to an output of each of the post-turning-off $\Delta t_1$ generating circuits $18_{UP}$, $18_{UN}$, $18_{VP}$, $18_{VN}$, $18_{WP}$, and $18_{WN}$, the post-turning-on $\Delta t_2$ generating circuits $19_{UP}$, $19_{UN}$, $19_{VP}$, $19_{VN}$, $19_{WP}$, and $19_{WN}$, and the simultaneous switching preventing logic circuits $20_{UP}$, $20_{UN}$, $20_{VP}$, $20_{VN}$, $20_{WP}$, and $20_{WN}$ in a case where a turn-on command signal for turning on each of the GTO elements VN and WN, which correspond to the other phases, is generated within a predetermined time period $\Delta t_1$ since the turn-off of the one of the GTO elements.

Occurrence of the simultaneous switching is prevented by causing the GTO elements to perform on/off operations according to the gate signals outputted from the simultaneous switching prevention circuit 17. Thus, the GTO elements can be caused to perform on/off operations in a condition in which the aforementioned drawbacks due to the stray capacitances $C_7$ to $C_{10}$ are eliminated.

All of the PWM pulse generating circuit 16 and the simultaneous switching prevention circuit 17 maybe implemented by software as a PWM pulse generating circuit with a simultaneous switching prevention function.

Although the specific embodiments of the invention have been described in detail with reference to the accompanying drawings, it is apparent to those skilled in the art that various changes and modifications may be made without departing from the scope and the spirit of the invention.

The invention claimed is:

1. An inverter apparatus comprising:
   a three-phase inverter including at least first and second pairs of switching elements connected in a bridge configuration, wherein the first and second pairs of switching elements convert a power supply voltage from a dc power supply to an ac voltage;
   an inverter control circuit; and
   a simultaneous switching prevention circuit that delays a turn-on of a first switching element of the first pair of switching elements, wherein
   the first switching element corresponds to a first phase and an electrode opposite an electrode corresponding to a second switching element of the second pair of switching elements,
   the second switching element corresponds to a second phase, and
   the delay is generated within a predetermined time after the second switching element of the second pair of switching elements is turned off.

2. An inverter apparatus comprising:
   a three-phase inverter including at least first and second pairs of switching elements connected in a bridge configuration, wherein the first and second pairs of switching elements convert a power supply voltage from a dc power supply, to an ac voltage;
   an inverter control circuit; and
   a simultaneous switching prevention circuit that delays a turn-off of a first switching element of the first pair of switching elements, wherein
   the first switching element corresponds to a first phase and an electrode opposite an electrode corresponding to a second switching element of the second pair of switching elements,
   the second switching element corresponds to a second phase, and
   the delay is generated within a predetermined time after the second switching element of the second pair of switching elements is turned on.

3. An inverter apparatus comprising:
   a three-phase inverter including at least first and second pairs of switching elements connected in a bridge configuration, wherein the first and second pairs of switching elements convert a power supply voltage from a dc power supply to an ac voltage;
   an inverter control circuit; and
   a simultaneous switching prevention circuit that delays a turn-off and a turn-on of a first switching element of the first pair of switching elements, wherein
   the first switching element corresponds to a first phase and an electrode opposite an electrode corresponding to a second switching element of the second pair of switching elements,
   the second switching element corresponds to a second phase,
   if the switching prevention circuit delays the turn-on, the delay is generated within a predetermined time after the second switching element of the second pair of switching elements is turned off, and
   if the switching prevention circuit delays the turn-off, the delay is generated within a predetermined time after the second switching element of the second pair of switching elements is turned on.

4. The inverter apparatus according to one of claims 1 and 3, wherein the simultaneous switching prevention circuit comprises:
   a predetermined-post-turning-off-time generating circuit that generates a predetermined time that elapses after the turn-off of the second switching element; and
   a simultaneous switching prevention logic circuit.

5. The inverter apparatus according to any one of claims 1-3, wherein the first and second pairs of switching elements are Si-GTO elements.

6. The inverter apparatus according to any one of claims 1-3, wherein the first and second pairs of switching elements are SiC-GTO elements.

7. The inverter apparatus according to any one of claims 1-3, wherein the first and second pairs of switching elements are wide-gap semiconductors including diamond and GaN.

8. The inverter apparatus according to one of claims 2 and 3, wherein the simultaneous switching prevention circuit comprises:
   a predetermined-post-turning-on-time generating circuit that generates a predetermined time that elapses after the turn-on of the second switching element; and
   a simultaneous switching prevention logic circuit.

* * * * *